United States Patent
Wang

(10) Patent No.: US 12,113,883 B2
(45) Date of Patent: Oct. 8, 2024

(54) DATA INTERACTION METHOD AND APPARATUS, VEHICLE, READABLE STORAGE MEDIUM AND CHIP

(71) Applicant: Xiaomi EV Technology Co., Ltd., Beijing (CN)

(72) Inventor: Gang Wang, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 46 days.

(21) Appl. No.: 18/104,041

(22) Filed: Jan. 31, 2023

(65) Prior Publication Data

US 2024/0114083 A1    Apr. 4, 2024

(30) Foreign Application Priority Data

Sep. 30, 2022  (CN) .......................... 202211211429.6

(51) Int. Cl.
*H04L 69/22* (2022.01)
*H04L 1/1607* (2023.01)
*H04L 1/1812* (2023.01)

(52) U.S. Cl.
CPC ............ *H04L 69/22* (2013.01); *H04L 1/1642* (2013.01); *H04L 1/1819* (2013.01)

(58) Field of Classification Search
CPC ........... H04N 21/2402; H04N 21/2187; H04N 21/2408; H04N 21/25841; H04N 21/2401;
(Continued)

(56) References Cited

U.S. PATENT DOCUMENTS 6,067,303 A * 5/2000 Aaker ................. H04L 12/5601
                                                       370/522
11,797,909 B2 * 10/2023 Endo ...................... G06V 20/10
(Continued)

FOREIGN PATENT DOCUMENTS

CN      204761720 U    11/2015
CN      111279729 A     6/2020
(Continued)

OTHER PUBLICATIONS

Extended European Search Report issued on Aug. 17, 2023 for European Patent Application No. 23154255.6.

*Primary Examiner* — Tan Doan
(74) *Attorney, Agent, or Firm* — Volpe Koenig

(57) ABSTRACT

A data interaction method, apparatuses and computer readable medium for connecting a user device to Service-Oriented Architecture (SOA) service in a vehicle. A data interaction method includes: forming a plurality of BLE channels by connecting a mobile terminal with a plurality of Bluetooth low energy (BLE) nodes of a vehicle separately, obtaining a service-oriented architecture (SOA) service request data packet of the vehicle, where data in the SOA service request data packet are configured to call an SOA service of the vehicle, obtaining a plurality of data sub-packets by dividing the SOA service request data packet, and sending the plurality of data sub-packets separately to the vehicle through the plurality of BLE channels; and sending a data packet of the mobile terminal to the vehicle through the plurality of BLE nodes, such that the SOA service of the vehicle can be called according to the data in the data packet.

20 Claims, 7 Drawing Sheets

(58) Field of Classification Search
CPC ........ H04N 21/64322; H04N 21/25808; H04L 65/612; H04L 65/80
USPC .......................................................... 709/231
See application file for complete search history.

(56) References Cited

U.S. PATENT DOCUMENTS

| | | | |
|---|---|---|---|
| 2014/0250204 A1* | 9/2014 | Shalunov | H04L 67/104 |
| | | | 709/217 |
| 2017/0053460 A1* | 2/2017 | Hauser | G07C 5/04 |
| 2020/0151476 A1* | 5/2020 | Wunsche, III | B60R 22/48 |
| 2021/0146884 A1 | 5/2021 | Wang et al. | |
| 2022/0014986 A1* | 1/2022 | Weizman | H04W 4/80 |
| 2022/0097704 A1* | 3/2022 | Collins | B60K 17/348 |

FOREIGN PATENT DOCUMENTS

| | | |
|---|---|---|
| CN | 108811185 B | 10/2021 |
| CN | 114599122 A | 6/2022 |
| CN | 114827912 A | 7/2022 |
| KR | 20200121170 A | 10/2020 |
| WO | 2018/103939 A1 | 6/2018 |
| WO | 2021/084086 A1 | 5/2021 |

* cited by examiner

ND APPARATUS, VEHICLE, READABLE
DATA INTERACTION METHOD AND APPARATUS, VEHICLE, READABLE STORAGE MEDIUM AND CHIP

CROSS REFERENCE TO RELATED APPLICATIONS

The disclosure is filed based on the Chinese Patent Application No. 202211211429.6 filed on Nov. 4, 2022, and claims the priority to the Chinese Patent Application, which is incorporated herein in its entirety by reference.

BACKGROUND

In related technical solutions, in order to connect a mobile phone to Service-Oriented Architecture (SOA) service in a vehicle, the mobile phone needs to be connected to WiFi in the vehicle at first, and access the Ethernet of the whole vehicle through WiFi routing.

SUMMARY

According to a first aspect of examples of the disclosure, a data interaction method is provided and is performed by a mobile terminal. The method includes forming a plurality of BLE channels by connecting a plurality of Bluetooth low energy (BLE) nodes of a vehicle separately; obtaining a service-oriented architecture (SOA) service request data packet of the vehicle, where data in the SOA service request data packet are configured to call an SOA service of the vehicle; obtaining a plurality of data sub-packets by dividing the SOA service request data packet; and sending the plurality of data sub-packets separately to the vehicle through the plurality of BLE channels.

According to a second aspect of the examples of the disclosure, a data interaction method is provided and is performed by a vehicle having a plurality of BLE nodes, and the method includes: receiving a BLE connection request sent by a mobile terminal; forming a plurality of BLE channels with the mobile terminal according to the BLE connection request; receiving a plurality of data sub-packets sent by the mobile terminal through the plurality of BLE channels; and obtaining an SOA service request data packet by splicing the plurality of data sub-packets, where data in the SOA service request data packet are configured to call an SOA service of the vehicle.

According to a third aspect of the examples of the disclosure, a mobile terminal is provided. The mobile terminal includes: a processor, and a memory configured to store a processor executable instruction, where the processor is configured to implement steps of the data interaction method described by the foregoing first aspect by executing the executable instruction.

According to a fourth aspect of the examples of the disclosure, a vehicle is provided. The vehicle includes: a processor, and a memory configured to store a processor executable instruction, where the processor is configured to implement steps of the data interaction method described by the foregoing second aspect by executing the executable instruction.

According to a fifth aspect of the examples of the disclosure, a non-transitory computer-readable storage medium is provided and stores a computer program instruction, where the computer program instruction implements steps of the data interaction method provided in the first aspect or the second aspect of the disclosure when executed by a processor.

According to a sixth aspect of the examples of the disclosure, a chip is provided and includes a processor and an interface; where the processor is configured to execute steps of the data interaction method provided in the first aspect or the second aspect of the disclosure by reading an instruction.

It is to be understood that the above general description and the following detailed description are merely illustrative and explanatory, and cannot limit the disclosure.

BRIEF DESCRIPTION OF THE DRAWINGS

The drawings here are incorporated into the description as a constituent part of the description, illustrate examples conforming to the disclosure, and serve to explain the principles of the disclosure along with the description.

DETAILED DESCRIPTION

Examples will be described in detail here, and instances of the examples are shown in accompanying drawings. When the following description involves the accompanying drawings, the same numbers in different accompanying drawings represent the same or similar elements unless otherwise indicated. The examples described in the following examples do not represent all examples consistent with the disclosure. On the contrary, these examples are merely instances of apparatuses and methods consistent with some aspects of the disclosure as detailed in the appended claims.

It can be understood that in the disclosure, "plurality" refers to two or more, and other quantifiers are understood similarly. When describing an association relation of associated objects, "and/or" means that there can be three relations, for example, A and/or B, which can mean that A exists independently, A and B exist at the same time, or B exists independently. The character "/" generally indicates that the associated objects in the context are in an "or" relation. The singular forms such as "a," "the," and "this" used are also intended to include the plural forms unless otherwise clearly stated in the context.

It can be further understood that although operations are described in the accompanying drawings in a specific order in examples of the disclosure, it should not be understood that these operations are required to be executed in a specific order or in serial order as shown, or that all illustrated operations are required to be executed so as to achieve expected results. In certain circumstances, multitasking and parallel processing can be favorable.

The disclosure relates to the field of autonomous driving, in particular to a data interaction method and apparatus, a vehicle, a readable storage medium and a chip.

In related technical solutions, in order to connect a mobile phone to Service-Oriented Architecture (SOA) service in a vehicle, the mobile phone needs to be connected to WiFi in the vehicle at first, and access the Ethernet of the whole vehicle through WiFi routing. For saving electricity, there are merely 3 to 4 Bluetooth low energy (BLE) nodes outside the vehicle in general, and WiFi will be accessible after the vehicle is powered on and started. As a result, it is impossible to connect to the WiFi and use the SOA service in the vehicle from users' approach to the vehicle to start of the vehicle, which affects the user experience accordingly.

Figure 1:
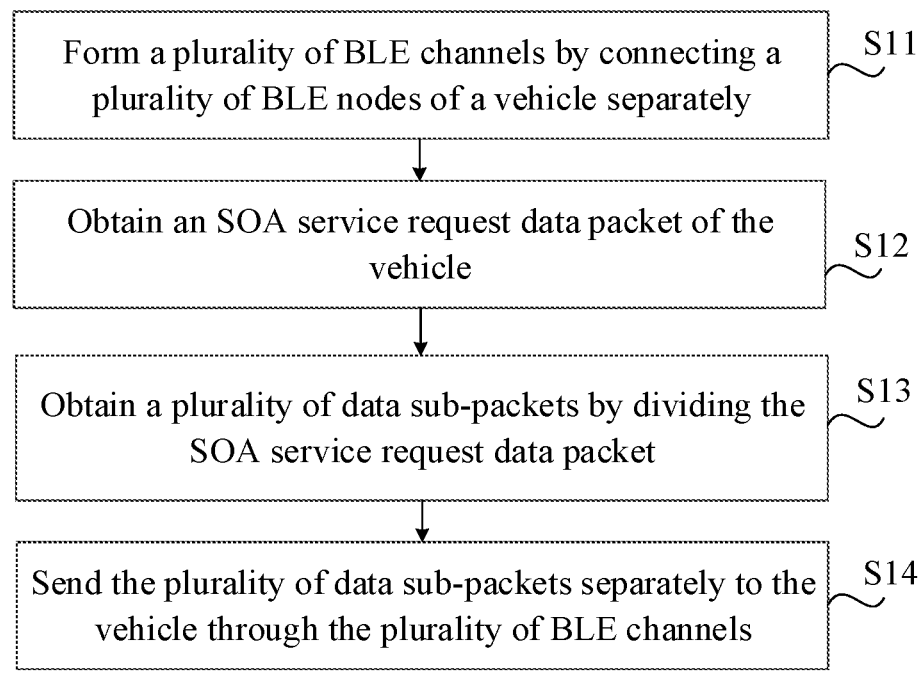
FIG. 1 is a flowchart of a data interaction method according to an example.

FIG. 1 is a flowchart of a data interaction method according to an example. The data interaction method is performed by a mobile terminal, such as a smart phone, or a tablet computer. As shown in FIG. 1, the data interaction method includes:

S11, a plurality of BLE channels are formed by separately connecting a plurality of Bluetooth low energy (BLE) nodes of a vehicle.

The vehicle may be provided with the plurality of BLE nodes in advance for broadcasting Bluetooth signals. In response to detecting the Bluetooth signal broadcast by the BLE node of the vehicle, the mobile terminal connects the plurality of BLE nodes of the vehicle to form the plurality of BLE channels, and one BLE node corresponds to one BLE channel.

S12, a service-oriented architecture (SOA) service request data packet of the vehicle is obtained.

SOA service is a software design method of distributed computing instead of specific technology. Some assemblies (a caller) of software may call another application software assembly to run and operate through a general protocol on a network, such that the caller may access the service.

According to a selection operation of a user, the SOA service request data packet is obtained, and data in the SOA service request data packet are configured to call an SOA service of the vehicle.

S13, a plurality of data sub-packets are obtained by dividing the SOA service request data packet.

S14, the plurality of data sub-packets are sent to the vehicle through the plurality of BLE channels.

Each of the plurality of BLE channels is traversed to detect whether there is an idle BLE channel in the plurality of BLE channels, and in response to detecting an idle BLE channel, a packet sending process is executed once until all the data sub-packets are sent to the vehicle.

A data packet of the mobile terminal is sent to the vehicle through the plurality of BLE nodes, and the SOA service of the vehicle is called according to the data in the data packet, such that the user may call the SOA service of the vehicle without starting the vehicle or connecting the WiFi in the vehicle, thus improving driving experience of the user.

Figure 2:
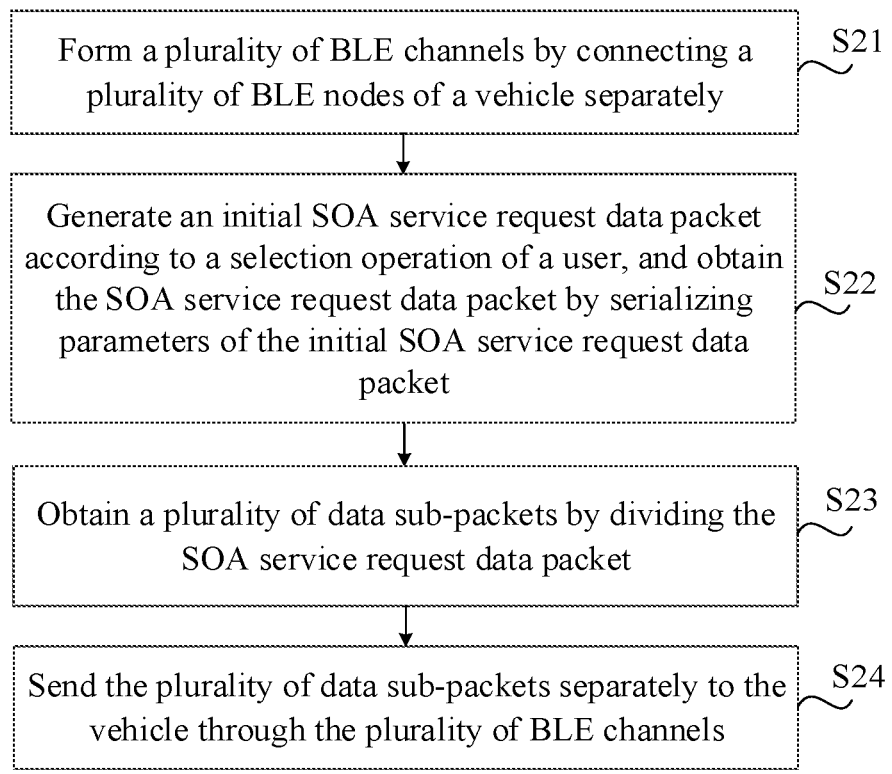
FIG. 2 is a flowchart of a data interaction method according to an example.

With reference to FIG. 2, FIG. 2 is a flowchart of a data interaction method according to an example of the disclosure. The method is executed by a mobile terminal, such as a smart phone or a tablet computer.

It is to be noted that the data interaction method shown in FIG. 2 is consistent with, in example contents, the data interaction method shown in FIG. 1, and reference may be made to the description of FIG. 1 for those not mentioned in FIG. 2, which will not be repeated here. The data interaction method shown in FIG. 2 includes:

S21, a plurality of BLE channels are formed by connecting a plurality of BLE nodes of a vehicle separately.

The vehicle may be provided with the plurality of BLE nodes in advance. A single BLE has low bandwidth, and may not carry traffic data of the SOA service. The plurality of BLE nodes may carry more communication data. In an example, the number of BLE nodes may be three, and in the disclosure, three BLE nodes are taken as an example for illustration.

In response to detecting the Bluetooth signal broadcast by the BLE node of the vehicle, the mobile terminal connects the three BLE nodes of the vehicle to form three BLE channels marked with C1, C2, and C3. The BLE channel is configured to transmit data between the mobile terminal and the vehicle.

S22, an initial SOA service request data packet is generated according to a selection operation of a user, and the SOA service request data packet is obtained by serializing the parameters of the initial SOA service request data packet.

SOA service is a software design method of distributed computing instead of specific technology. Some assemblies (a caller) of software may call another application software assembly to run and operate through a general protocol on a network, such that the caller may access the service. For example, the caller may call some services by calling the SOA service, such as window moving. Window position parameters are configured with the SOA service, a window position adjustment signal is sent by means of a window control subsystem, the window position adjustment signal is configured to trigger a corresponding CAN signal, and the CAN signal is configured to adjust a window position. Here is another example, an SOA brake service is used to control the vehicle to complete braking. It is to be noted that there are several domains under the SOA service, and there are usually dozens of atomic services or composite services under each domain. The atomic services control one subsystem separately, and the composite services control a plurality of subsystems at the same time.

An initial SOA service request data packet is generated according to a selection operation of a user, and the SOA service request data packet is obtained by serializing the parameters of the initial SOA service request data packet. Since an operating system used by the mobile terminal is different from that used by the vehicle, a data format used by the mobile terminal is different from that used by the vehicle. Thus, data in the initial SOA service request data packet generated by the mobile terminal are needed to be serialized, and the data in the initial SOA service request data packet are converted into a data format identifiable by the operating system of the vehicle, so as to obtain the SOA service request data packet, and the data in the SOA service request data packet are configured to call the SOA service of the vehicle.

For example, the user selects an SOA door opening service, and the mobile terminal generates an initial SOA door opening request data packet according to a selection of the user. After the parameters of the initial SOA door opening request data packet are serialized, the SOA door opening request data packet is obtained, and data in the SOA door opening request data packet are configured to call the SOA door opening service of the vehicle, so as to control the vehicle to open the door.

S23, a plurality of data sub-packets are obtained by dividing the SOA service request data packet.

The plurality of data sub-packets are obtained by dividing the above SOA service request data packet obtained by means of parameter serialization.

In an example, each SOA service request data packet may be divided according to 240 bytes, that is, each data sub-packet has a size of 240 bytes, and these data sub-packets are marked with SP1, SP2, SP3, and SP4.

S24, the plurality of data sub-packets are separately sent to the vehicle through the plurality of BLE channels.

Each of the plurality of BLE channels is traversed to detect whether there is an idle BLE channel in the plurality of BLE channels. In response to detecting an idle BLE channel, a packet sending process is executed once all the data sub-packets are sent to the vehicle.

The above packet sending process includes: a target data sub-packet is selected from the plurality of data sub-packets; a field-filled target data sub-packet is obtained by filling a header of the target data sub-packet with a service identifier, a packet sending sequence identifier and cyclic redundancy check data; and the field-filled target data sub-packet is transmitted by using the idle BLE channel. The service identifier represents a category of the SOA service. For example, an SOA brake service and an SOA tooting service belong to different categories of SOA services. The packet sending sequence identifier is a packet sending sequence corresponding to the data sub-packet. The cyclic redundancy check (CRC) data are configured to check the data integrity of the data sub-packet, and CRC is a universal and mature method for checking data integrity in the field, and will not be repeated in the disclosure.

For example, three BLE channels C1, C2 and C3 may be traversed circularly to detect whether there is an idle BLE channel in C1, C2, and C3 may be detected. In response to detecting an idle BLE channel, for example, in case that C1 is detected as an idle BLE channel, the packet sending process may be executed once. The packet sending process includes: the target data sub-packet is selected from the plurality of data sub-packets, the data sub-packet may be selected according to a data sub-packet identification sequence, or a data sub-packet may be randomly selected from the plurality of data sub-packets as the target data sub-packet, and the header of the target data sub-packet is filled with 2 bytes of service identifier (Command ID), 2 bytes of packet sending sequence identifier (Seq value) and 2 bytes of CRC data to obtain the target data sub-packet filled with fields, and the target data sub-packet filled with fields is transmitted to the vehicle through the idle BLE channel. After C1 is traversed and detected to be an idle BLE channel, whether C2 is an idle BLE channel is detected, and if so, the packet sending process is executed once through C2; if not, whether C3 is an idle BLE channel is detected, and if so, the packet sending process above is executed, which will not be repeated here, and the above steps are performed until all the data sub-packets are sent to the vehicle.

Figure 3:
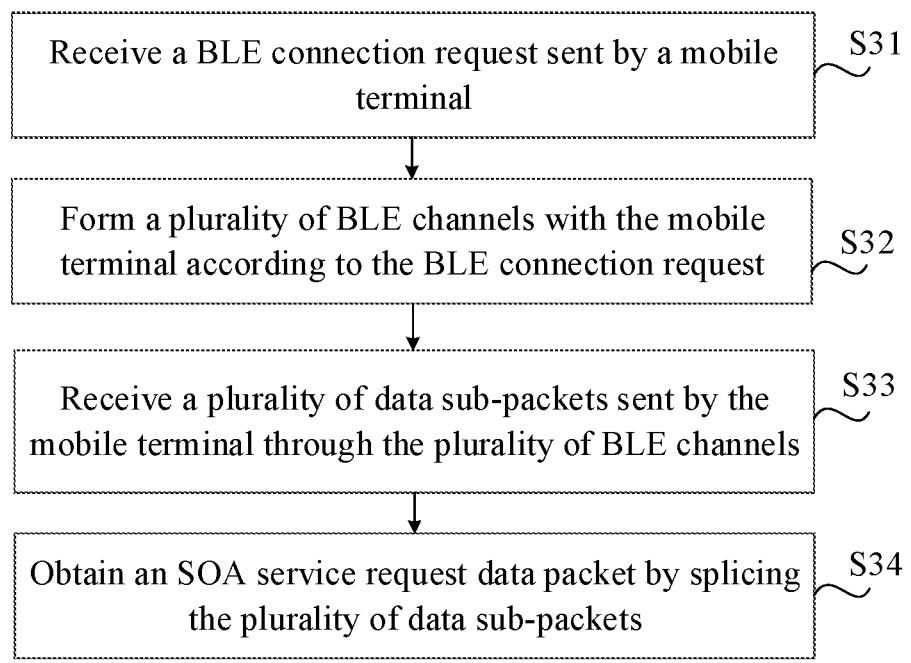
FIG. 3 is a flowchart of a data interaction method according to an example.

With reference to FIG. 3, FIG. 3 is a flowchart of another data interaction method according to an example of the disclosure. The method is executed by a vehicle, and the vehicle may be the vehicle mentioned in the example of FIG. 1 or 2. Thus, the data interaction method shown in FIG. 3 is consistent with, in example contents, the data interaction method shown in FIG. 1 or 2, and those not mentioned in FIG. 3 may refer to the description of FIG. 1 or 2, which will not be repeated here.

The data interaction method shown in FIG. 3 includes:

S31, a BLE connection request sent by a mobile terminal is received.

The vehicle may be provided with the plurality of BLE nodes in advance. A single BLE has low bandwidth, and may not carry traffic data of the SOA service. The plurality of BLE nodes may carry more communication data. In an example, the number of BLE nodes may be three, and in the disclosure, three BLE nodes are taken as an example for illustration.

For example, the vehicle broadcasts Bluetooth signals through these three BLE nodes, and the mobile terminal approaches the vehicle gradually. In response to detecting the Bluetooth signals broadcast by the BLE nodes of the vehicle, the mobile terminal sends the BLE connection request to the vehicle, and the vehicle receives the BLE connection request sent by the mobile terminal.

S32, a plurality of BLE channels are formed with the mobile terminal according to the BLE connection request.

According to the BLE connection request sent by the mobile terminal of the vehicle, a response message of the BLE connection request is sent to the mobile terminal. The mobile terminal receives the response message and connects three BLE nodes of the vehicle separately to form three BLE channels. The three BLE channels may be marked with C1, C2 and C3. The BLE channel is configured to transmit data between the mobile terminal and the vehicle.

S33, a plurality of data sub-packets sent by the mobile terminal are received through the plurality of BLE channels.

The plurality of data sub-packets sent by the mobile terminal are received through the plurality of BLE channels.

S34, an SOA service request data packet is obtained by splicing the plurality of data sub-packets.

Figure 4:
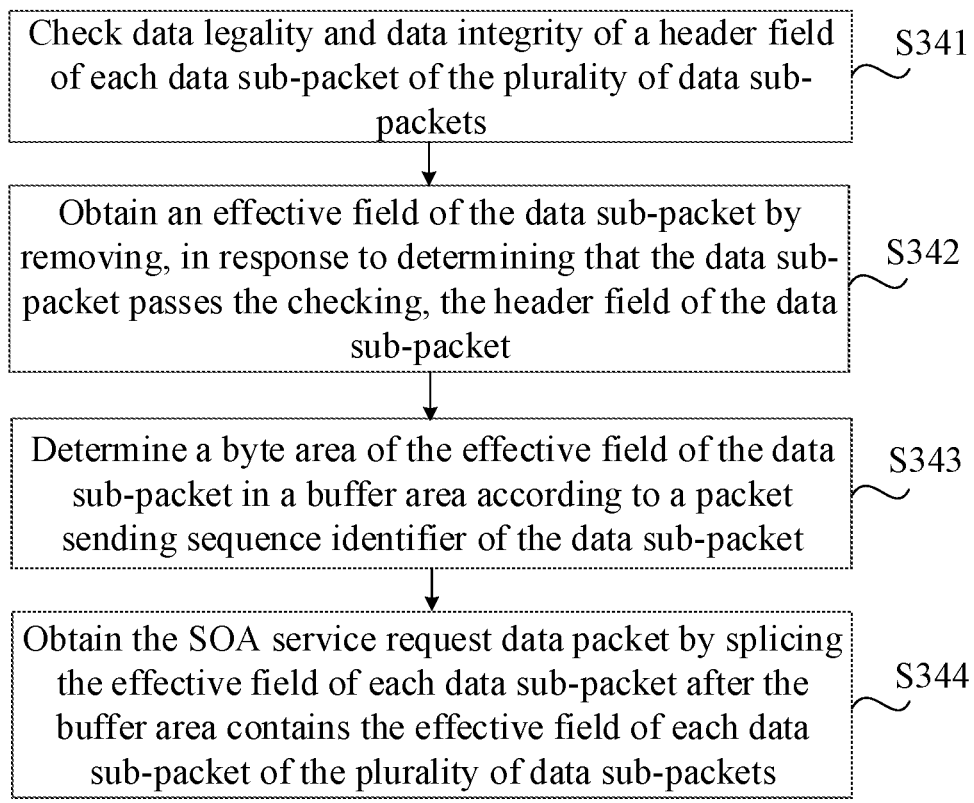
FIG. 4 is a flowchart of sub-steps of S34 according to an example.

It is to be noted that S34 may also include sub-step S341, sub-step S342, sub-step S343 and sub-step S344, and a specific splicing method of obtaining the SOA service request data packet will be described in detail in the sub-steps of S34. With reference to FIG. 4, FIG. 4 is a flowchart of sub-steps of S34 according to an example of the disclosure.

S341, data legality and data integrity of a header field of each data sub-packet of the plurality of data sub-packets are checked.

In response to determining that all data sub-packets of the SOA service request data packet are received, the data legality and the data integrity of the header field of each data sub-packet of the plurality of data sub-packets are checked.

The received data sub-packets are analyzed to obtain a header field for each data sub-packet. The header includes a service identifier, a packet sending sequence identifier and cyclic redundancy check data. In an example, the header field includes 2 bytes of service identifier (Command ID), 2 bytes of packet sending sequence identifier (Seq value) and 2 bytes of CRC data. The Command ID represents a category of the SOA service. For example, an SOA brake service and an SOA tooting service belong to different categories of SOA services. Seq value is a packet sending sequence corresponding to the data sub-packet. The cyclic redundancy check (CRC) data are configured to check the data integrity of the data sub-packet, that is, to check whether the data in the data sub-packet are wrong, tampered, etc. In an example, the step that data legality and data integrity of a header field of each data sub-packet of the plurality of data sub-packets are checked includes: data legality and data consistency of Command ID are checked, and data legality of the CRC data is checked. The data legality of Command ID refers to the data security of Command ID, the data consistency of Command ID refers to data integrity of the Command ID, and the data legality of CRC data refers to the data integrity of the data sub-packet.

For example, the step that data legality and data integrity of a header field of each data sub-packet of the plurality of data sub-packets are checked includes: consistency and legality of the service name of the data packet are checked according to the Command ID in the data packet, and the command ID represents the category of SOA service. For example, whether Command IDs of data sub-packets of the same SOA service request data packet are consistent or whether the Command ID of each data sub-packet is legal is checked. According to CRC data in the data packet, integrity of data in the corresponding data packet is checked, and the cyclic redundancy check data are configured to check the data integrity of the data sub-packet. CRC is a universal and mature method for checking data integrity in the field, and will not be repeated in the disclosure. In response to determining that the header field passes the data validity checking and CRC data checking, it is determined that the data sub-packet passes checking.

S342, an effective field of the data sub-packet is obtained by removing, in response to determining that the data sub-packet passes the checking, the header field of the data sub-packet.

The effective field of the data sub-packet is obtained by removing, in response to determining that the data sub-packet passes the checking, the header field of the data sub-packet. In an example, the header field includes 2 bytes of Command ID, 2 bytes of Seq value and 2 bytes of CRC data, and header field data of the first 6 bytes of the data sub-packet are removed to obtain the effective field of the data sub-packet.

S343, a byte area of the effective field of the data sub-packet in a buffer area is determined according to a packet sending sequence identifier of the data sub-packet.

For example, it is assumed that each data sub-packet has a size of 240 bytes, Seq value of a current data sub-packet is marked with SEQ (n), and compared with Seq value SEQ(n−1) of a previous data sub-packet, if SEQ (n)−SEQ (n−1)=1, it means that the current data sub-packet is a next logical packet of the previous data sub-packet, header field data of first 6 bytes of the data sub-packet are removed, and an effective field is saved in subsequent 240 byte area of a current buffer area. If SEQ(n)−SEQ(n−1)=x, and (x>1), header field data of the first 6 bytes of the data sub-packet are removed, and an effective field is saved in subsequent 240*(x−1) byte area of a current buffer area.

S344, the SOA service request data packet is obtained by splicing the effective field of each data sub-packet after the buffer area contains the effective field of each data sub-packet of the plurality of data sub-packets.

For example, it may be determined that the buffer area contains all data sub-packets according to the Seq value of the data sub-packet, and the SOA service request data packet is obtained by splicing the effective field of each data sub-packet after the buffer area contains the effective field of each data sub-packet of the plurality of data sub-packets. Data in the SOA service request data packet are configured to call an SOA service of the vehicle, such as an SOA brake service, an SOA booting service.

In an example, after the effective fields of the data sub-packets are spliced, the parameters of the effective field spliced are needed to be deserialized to obtain the SOA service request data packet. Since an operating system used by the mobile terminal is different from that used by the vehicle, a data format used by the mobile terminal is different from that used by the vehicle. The SOA service request data packets sent by the mobile terminal are obtained by means of parameter serialization. Thus, the vehicle needs to deserialize the parameters of the data in the SOA service request data packet sent by the mobile terminal, and convert the data in the SOA service request data packet into a data format readable by an operating system of the vehicle, so as to facilitate reading of the data in the SOA service request data packet and calling of the SOA service of the vehicle.

The vehicle receives a data packet sent by the mobile terminal through the plurality of BLE nodes, and the SOA service of the vehicle is called according to the data in the data packet, such that the user may call the SOA service of the vehicle without starting the vehicle or connecting the WiFi in the vehicle, thus improving driving experience of the user.

To sum up, the data interaction method provided by the disclosure includes: the mobile terminal is connected with the plurality of BLE nodes of the vehicle separately to form the plurality of BLE channels, the SOA service request data packet is obtained, the data in the SOA service request data packet are configured to call the SOA service of the vehicle, the plurality of data sub-packets are obtained by dividing the SOA service request data packet, and the plurality of data sub-packets are separately sent to the vehicle through the plurality of BLE channels; and a data packet of the mobile terminal is sent to the vehicle through the plurality of BLE nodes, and the SOA service of the vehicle is called according to the data in the data packet, such that the user may call the SOA service of the vehicle without starting the vehicle or connecting the WiFi in the vehicle, thus improving driving experience of the user.

Figure 5:
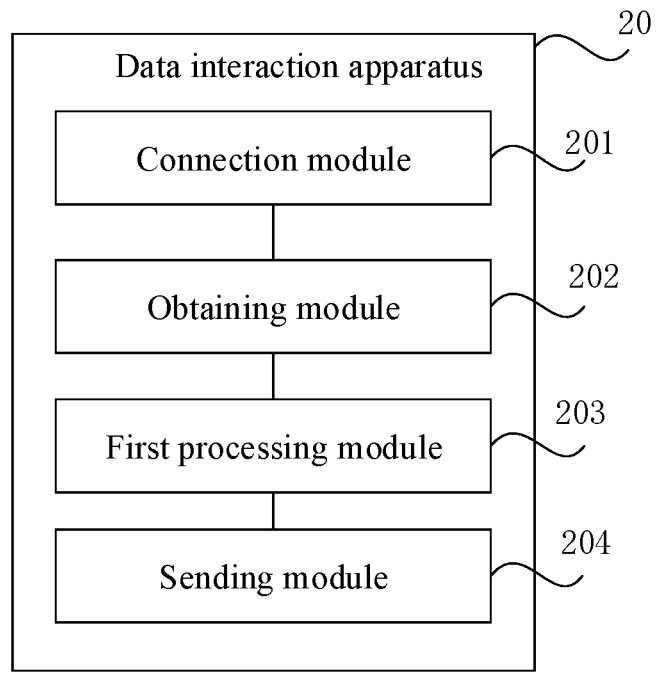
FIG. 5 is a block diagram of a data interaction apparatus according to an example.

FIG. 5 is a block diagram of a data interaction apparatus according to an example. With reference to FIG. 5, the data interaction apparatus is applied to a mobile terminal, and the data interaction apparatus 20 includes a connection module 201, an obtaining module 202, a first processing module 203 and a sending module 204.

The connection module 201 is configured to form a plurality of BLE channels by connecting a plurality of BLE nodes of a vehicle separately.

The obtaining module 202 is configured to obtain an SOA service request data packet of the vehicle, where data in the SOA service request data packet are configured to call the SOA service of the vehicle.

The first processing module 203 is configured to obtain a plurality of data sub-packets by dividing the SOA service request data packet.

The sending module 204 is configured to send the plurality of data sub-packets separately to the vehicle through the plurality of BLE channels.

Alternatively, the obtaining module 202 is further configured to generate an initial SOA service request data packet according to a selection operation of a user; and
  obtain the SOA service request data packet by serializing the parameters of the initial SOA service request data packet.

Alternatively, the sending module 204 is further configured to traverse each of the plurality of BLE channels, and in response to detecting an idle BLE channel, execute a packet sending process once until all the data sub-packets are sent to the vehicle.

The packet sending process includes:
  a target data sub-packet is selected from the plurality of data sub-packets;
  a field-filled target data sub-packet is obtained by filling a header of the target data sub-packet with a service identifier, a packet sending sequence identifier and cyclic redundancy check data, where the service identifier represents a category of the SOA service, the packet sending sequence identifier is a packet sending sequence corresponding to the data sub-packet, and the cyclic redundancy check data are configured to check data integrity of the data sub-packet; and
  the field-filled target data sub-packet is transmitted by using the idle BLE channel.

Figure 6:
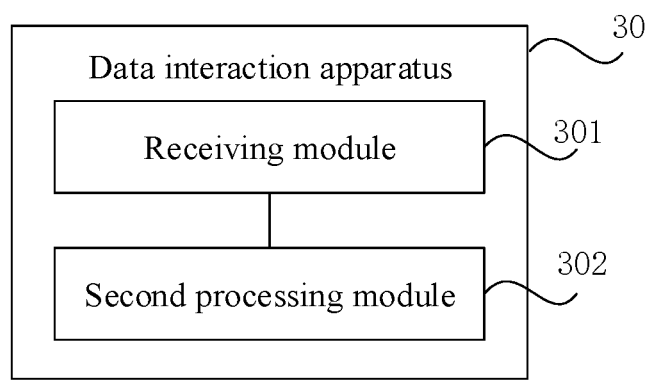
FIG. 6 is a block diagram of a data interaction apparatus according to an example.

FIG. 6 is a block diagram of a data interaction apparatus according to an example. With reference to FIG. 6, the data interaction apparatus is applied to a vehicle, the data interaction apparatus 30 includes a receiving module 301 and a second processing module 302.

The receiving module 301 is configured to receive a BLE connection request sent by a mobile terminal.

The second processing module 302 is configured to form a plurality of BLE channels with the mobile terminal according to the BLE connection request.

The receiving module 301 is configured to receive a plurality of data sub-packets sent by the mobile terminal through the plurality of BLE channels.

The second processing module 302 is further configured to obtain an SOA service request data packet by splicing the plurality of data sub-packets, where data in the SOA service request data packet are configured to call the SOA service of the vehicle.

Alternatively, the second processing module 302 is further configured to check data legality and data integrity of a header field of each data sub-packet of the plurality of data sub-packets; and obtain an effective field of the data sub-packet by removing, in response to determining that the data sub-packet passes the checking, the header field of the data sub-packet;
- determine a byte area of the effective field of the data sub-packet in a buffer area according to a packet sending sequence identifier of the data sub-packet, where the packet sending sequence identifier is a packet sending sequence corresponding to the data sub-packet; and
- obtain the SOA service request data packet by splicing the effective field of each data sub-packet after the buffer area contains the effective field of each data sub-packet of the plurality of data sub-packets.

Alternatively, the second processing module 302 is further configured to check the consistency and legality of a service name of the data packet according to a service identifier in the data packet, where the service identifier represents a category of the SOA service; and
- check the data integrity of the corresponding data packet according to cyclic redundancy check data in the data packet, where the cyclic redundancy check data are configured to check the data integrity of the data sub-packet.

Alternatively, the second processing module 302 is further configured to splice the effective fields of the data sub-packets and
- obtain the SOA service request data packet by deserializing the parameters of the effective field spliced.

With respect to the apparatus in the above examples, specific ways in which the various modules execute operations have been described in detail in the examples relating to the method, and will not be described in detail here.

The disclosure further provides a non-transitory computer-readable storage medium storing a computer program instruction, the program instruction implementing steps of the data interaction method provided by the disclosure when executed by a processor.

Figure 7:
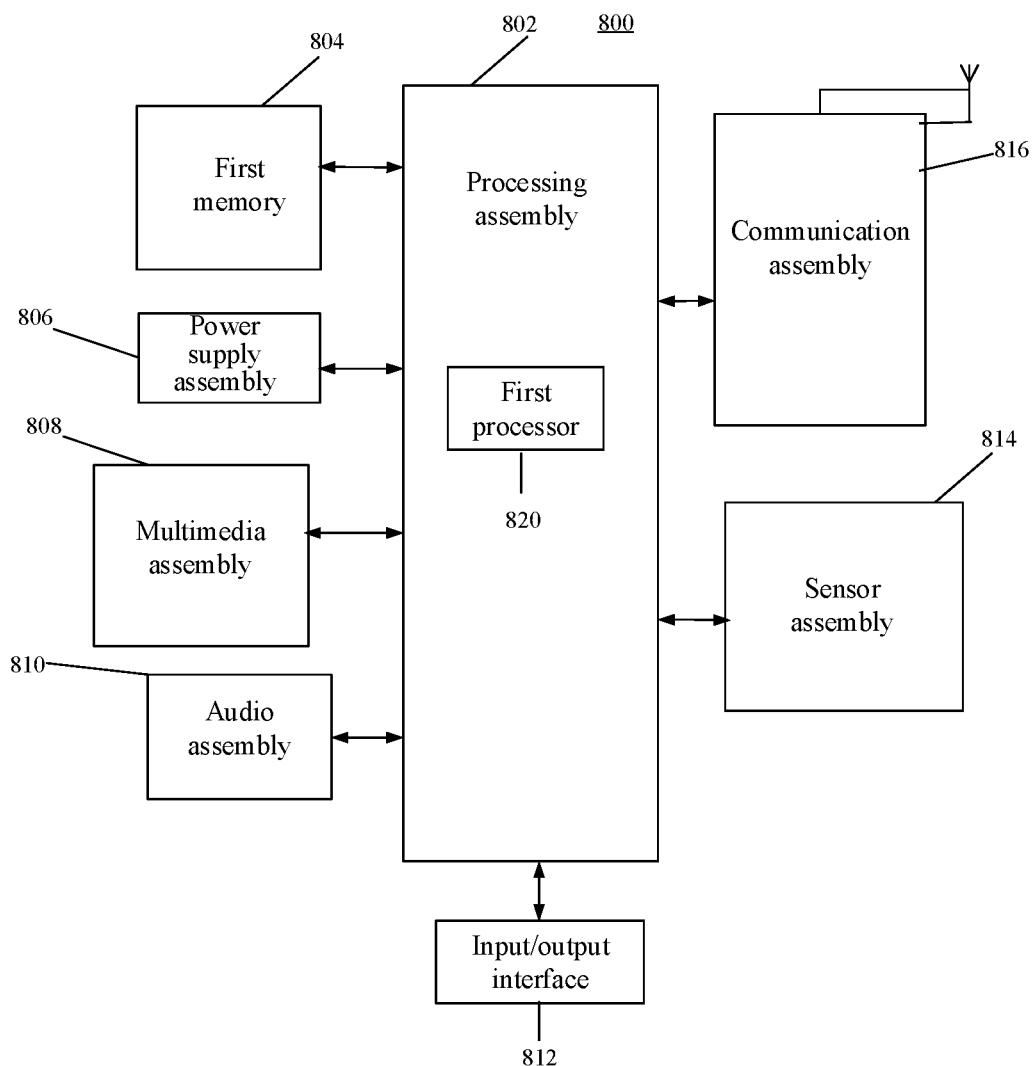
FIG. 7 is a block diagram of a data interaction apparatus according to an example.

FIG. 7 is a block diagram of a data interaction apparatus according to an example. The apparatus 800 is an electronic device, such as the foregoing mobile terminal or tablet computer.

With reference to FIG. 7, the apparatus 800 may include one or more of a processing assembly 802, a memory 804, a power supply assembly 806, a multimedia assembly 808, an audio assembly 810, an input/output interface 812, a sensor module 814, and a communication assembly 816.

Generally, the processing assembly 802 controls an overall operation of the apparatus 800, such as operations associated with display, telephone calls, data communication, a camera operation, and a recording operation. The processing assembly 802 may include one or more first processors 820, to execute instructions, so as to complete all or some of the steps of the methods described above. In addition, the processing assembly 802 may include one or more modules to facilitate interaction between the processing assembly 802 and other assemblies. For example, the processing assembly 802 may include a multimedia module to facilitate interaction between the multimedia assembly 808 and the processing assembly 802.

The first memory 804 is configured to store various types of data, to support the operations on the apparatus 800. Instances of such data include an instruction, operated on the apparatus 800, for any application or method, contact data, phonebook data, messages, pictures, video, etc. The first memory 804 may be formed by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 806 energizes various assemblies of the apparatus 800. The power supply assembly 806 may include a power management system, one or more power supplies, and other assemblies associated with power generation, management, and distribution for the apparatus 800.

The multimedia assembly 808 includes a screen providing an output interface between the apparatus 800 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touching, swiping, and gestures on the TP. The touch sensors may not only sense a boundary of a touch or swipe action, but also detect a time of duration and a pressure associated with the touch or swipe action. In some examples, the multimedia assembly 808 includes a front facing camera and/or a rear facing camera. When the apparatus 800 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 810 is configured to output and/or input audio signals. For example, the audio assembly 810 includes a microphone (MIC). The microphone is configured to receive an external audio signal when the apparatus 800 is in operation modes such as a call mode, a recording mode and a speech identification mode. The received audio signals may be further stored in the first memory 804 or transmitted by the communication assembly 816. In some examples, the audio assembly 810 may further include a speaker to output audio signals.

The input/output interface 812 provides an interface between the processing assembly 802 and a peripheral interface module. The peripheral interface module may be a keyboard, a click wheel, a button, etc. These buttons may include, but are not limited to, a home button, a volume button, a start button, and a lock button.

The sensor assembly 814 includes one or more sensors for providing state assessments of various aspects of the apparatus 800. For example, the sensor assembly 814 may detect an on/off state of the apparatus 800, and relative positioning of assemblies. For example, the assembly is a display and a keypad of the apparatus 800. The sensor assembly 814 may also detect a change in position of the apparatus 800 or an assembly of the apparatus 800, presence or absence of contact between the user and the apparatus 800, orientation or acceleration/deceleration of the apparatus 800, and temperature change of the apparatus 800. The sensor assembly 814 may include a proximity sensor configured to detect the presence of nearby objects without any physical contact. The sensor assembly 814 may further include an optical sensor, such as a complementary metal-oxide-semiconductor transistor (CMOS) or charge-coupled device (CCD) image sensor, for use in imaging applications. In some examples, the sensor assembly 814 may further include an acceleration sensor, a gyroscope sensor, a magnetic sensor, a pressure sensor, or a temperature sensor.

The communication assembly 816 is configured to facilitate wired or radio communication between the apparatus 800 and other devices. The apparatus 800 may access a wireless network based on a communication standard, such as WiFi, the 2nd generation mobile communication technology (2G) or the 3rd generation mobile communication technology (3G), or their combinations. In an example, the communication assembly 816 receives a broadcast signal or broadcast related information from an external broadcast management system via a broadcast channel. In an example, the communication assembly 816 further includes a near field communication (NFC) module to promote short-range communications. For example, the NFC module may be implemented based on a radio frequency identification (RFID) technology, an infrared data association (IrDA) technology, an ultra-wide band (UWB) technology, a Bluetooth (BT) technology, etc.

In an example, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, so as to execute the above data interaction method.

In an example, further provided is a non-transitory computer-readable storage medium including an instruction, such as the first memory 804 including an instruction. The instruction may be executed by the first processor 820 of the apparatus 800 so as to complete the above method. For example, the non-transitory computer readable storage medium may be a read only memory (ROM), a random access memory (RAM), a CD-ROM, a magnetic tape, a floppy disc, an optical data storage device, etc.

The above apparatus may be a part of a separate electronic device in addition to a separate electronic device. For instance, in an example, the apparatus may be an integrated circuit (IC) or a chip, where the integrated circuit may be an IC or a set of a plurality of ICs; and the chip may include, but is not limited to, the following categories: a graphics processing unit (GPU), a central processing unit (CPU), a field programmable gate array (FPGA), a digital signal processor (DSP), an application specific integrated circuit (ASIC), a system on chip (SOC), etc. The above integrated circuit or chip may be used to execute executable instructions (or codes), so as to implement the above data interaction method. The executable instructions may be stored in the integrated circuit or chip or retrieved from other apparatuses or devices. For example, an integrated circuit or chip includes a second processor, a second memory, and interfaces for communicating with other apparatuses. The executable instructions may be stored in the second memory, and implement the above data interaction method when executed by the second processor; alternatively, the integrated circuit or chip may receive the executable instructions through the interface and transmit the executable instructions to the second processor for execution, so as to implement the above data interaction method.

Figure 8:
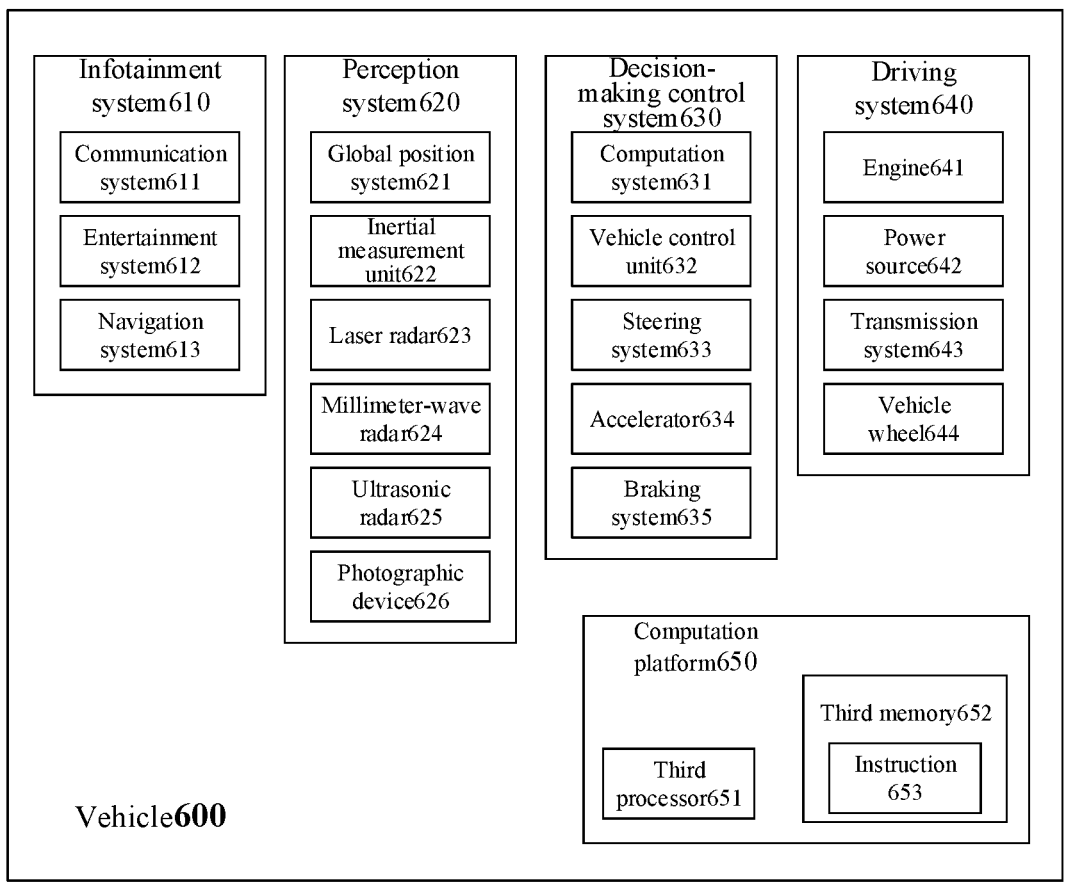
FIG. 8 is a schematic block diagram of the functions of a vehicle according to an example.

With reference to FIG. 8, FIG. 8 is a schematic block diagram of functions of a vehicle 600 according to an example. The vehicle 600 may be configured in a full or partial autonomous driving mode. For example, the vehicle 600 may obtain surrounding environment information through a perception system 620, and obtain an autonomous driving strategy based on analysis of the surrounding environment information to achieve full autonomous driving, or present an analysis result to a user to achieve partial autonomous driving.

The vehicle 600 may include various subsystems, such as an infotainment system 610, a perception system 620, a decision-making control system 630, a driving system 640, and a computation platform 650. Alternatively, the vehicle 600 may include more or fewer subsystems, and each subsystem may include a plurality of components. In addition, each subsystem and component of the vehicle 600 may be interconnected by wired or wireless means.

In some examples, the infotainment system 610 may include a communication system 611, an entertainment system 612 and a navigation system 613.

The communication system 611 may include a wireless communication system, which may wirelessly communicate with one or more devices directly or via a communication network. For example, the wireless communication system may use 3G cellular communication such as CDMA, EVD0, GSM/GPRS, or 4G cellular communication such as LTE or 5G cellular communication. A wireless communication system may communicate with a wireless local area network (WLAN) by using WiFi. In some examples, the wireless communication system may directly communicate with devices by using infrared links, Bluetooth or ZigBee. Other wireless protocols, such as various vehicle communication systems, for example, a wireless communication system may include one or more dedicated short range communications (DSRC) devices, which may include public and/or private data communication between vehicles and/or roadside stations.

The entertainment system 612 may include a display device, a microphone and a stereo. A user may listen to the radio and play music in the vehicle based on the entertainment system, or connect the mobile phone with the vehicle, and achieves screen projection of the mobile phone on the display device, the display device may be a touch type and the user may operate by touching the screen.

In some cases, a voice signal of the user may be obtained through the microphone, and some control over the vehicle 600 by the user may be implemented according to the analysis of the voice signal of the user, such as adjusting a temperature inside the vehicle. In other cases, music may be played for the user through the stereo.

The navigation system 613 may include a map service provided by a map provider, so as to provide the vehicle 600 with navigation of a driving route. The navigation system 613 may be used in conjunction with a global positioning system 621 and an inertial measurement unit 622 of the vehicle. The map service provided by the map provider may be a two-dimensional map or high-definition map.

The perception system 620 may include several sensors that sense information about environment around the vehicle 600. For example, the perception system 620 may include a global positioning system 621 (which may be a GPS system, a Beidou system or other positioning systems), an inertial measurement unit (IMU) 622, a laser radar 623, a millimeter-wave radar 624, an ultrasonic radar 625, and a photographic device 626. The perception system 620 may further include sensors of an internal system of a monitored vehicle 600 (for example, an in-vehicle air quality monitor, a fuel gauge, an oil temperature gauge). Sensor data from one or more of these sensors may be used to detect objects and their corresponding features (a position, a shape, a direction, a speed, etc.). The detection and identification are key functions of the safe operation of the vehicle 600.

The global positioning system 621 is configured to estimate a geographical position of the vehicle 600.

The inertial measurement unit 622 is configured to sense a posture change of the vehicle 600 based on inertial acceleration. In some examples, the inertial measurement unit 622 may be a combination of an accelerometer and a gyroscope.

A laser radar 623 uses a laser to sense objects in the environment where the vehicle 600 is located. In some examples, the laser radar 623 may include one or more laser sources, laser scanners and one or more detectors, among other system assemblies.

The millimeter-wave radar 624 uses radio signals to sense objects in the surrounding environment of the vehicle 600. In some examples, in addition to sensing the object, the millimeter wave radar 624 may also be configured to sense a speed and/or a direction of the object.

The ultrasonic radar 625 may use ultrasonic signals to sense objects around the vehicle 600.

The photographic device 626 is configured to capture image information of the surrounding environment of the vehicle 600. The photographic device 626 may include a monocular camera, a binocular camera, a structured light camera, a panorama camera, etc. The image information obtained by the photographic device 626 may include static images or video stream information.

The decision-making control system 630 includes a computation system 631 for analysis and decision making based on the information obtained by the perception system 620. The decision-making control system 630 further includes a vehicle control unit 632 that controls a power system of the vehicle 600, a steering system 633 for controlling the vehicle 600, an accelerator 634 and a braking system 635.

The computation system 631 is operable to process and analyze different kinds of information obtained by the perception system 620 in order to identify targets, objects and/or features in the surrounding environment of the vehicle 600. The targets may include pedestrians or animals, and the objects and/or features may include traffic signals, road boundaries and obstacles. The computation system 631 may use techniques such as an object identification algorithm, a structure from motion (SFM) algorithm and video tracking. In some examples, the computation system 631 may be used to map the environment, track objects, estimate the speed of objects, etc. The computation system 631 may analyze the obtained information of different kinds and obtain the control strategy for the vehicle.

The vehicle control unit 632 may be used to coordinate and control a power battery and an engine 641 of the vehicle to improve power performance of the vehicle 600.

The steering system 633 is operable to adjust a forward moving direction of the vehicle 600, such as a steering wheel system in an example.

The accelerator 634 is configured to control an operating speed of the engine 641 and thus the speed of the vehicle 600.

The braking system 635 is configured to control the vehicle 600 to slow down. The braking system 635 may use friction to slow down the wheels 644. In some examples, the braking system 635 may convert kinetic energy of the wheels 644 into electric current. The braking system 635 may also take other forms to slow down the rotation speed of the wheels 644 so as to control the speed of the vehicle 600.

The driving system 640 may include assemblies that provide power movement for the vehicle 600. In an example, the driving system 640 may include an engine 641, an energy source 642, a transmission system 643 and wheels 644. The engine 641 may be an internal combustion engine, an electric motor, an air compression engine or other types of engine combinations, such as a hybrid engine composed of a gasoline engine and electric motor, and a hybrid engine composed of an internal combustion engine and an air compression engine. The engine 641 converts the energy source 642 into mechanical energy.

Examples of the energy source 642 include gasoline, diesel, other fuels based on petroleum, propane, other fuels based on compressed gas, ethanol, solar panels, batteries and other power sources. The energy source 642 may also provide energy for other systems of the vehicle 600.

The transmission system 643 may transmit mechanical power from the engine 641 to the wheels 644. The transmission system 643 may include a gearbox, a differential and drive shafts. In an example, the transmission system 643 may further include other devices, such as a clutch. The drive shafts may include one or more shafts that may be coupled to one or more wheels 644.

Some or all functions of the vehicle 600 are controlled by the computation platform 650. The computation platform 650 may include at least one third processor 651, and the third processor 651 may execute instructions 653 stored in a non-transitory computer-readable medium such as a third memory 652. In some examples, the computation platform 650 may further be a plurality of computing devices that control individual assemblies or subsystems of the vehicle 600 in a distributed manner.

The third processor 651 may be any conventional processor, such as a commercially available CPU. Alternatively, the third processor 651 may further include a graphic process unit (GPU), a field programmable gate array (FPGA), a system on chip (SOC), an application specific integrated circuit (ASIC) or their combinations. Although FIG. 8 functionally illustrates a third processor, a third memory, and other elements of a computer in the same block, those skilled in the art need to understand that the third processor, the computer, or the third memory may actually include a plurality of third processors, computers, or third memories that may be or may not be stored in the same physical housing. For example, the third memory may be a hard disk drive or any other storage medium located in a housing different from the computer. Thus, a reference to a third processor or computer will be understood to include a reference to a collection of third processors or computers or third memories that may or may not operate in parallel.

Instead of using a single third processor to execute the steps described here, some assemblies, such as steering assemblies and deceleration assemblies, may each have respective third processors, and the third processor merely executes computations related to assembly-specific functions.

In the example of the disclosure, the third processor 651 may execute the data interaction method described above.

In various aspects described here, the third processor 651 may be located remotely from the vehicle and wirelessly communicate with the vehicle. In other aspects, some of the processes described here are executed on a third processor arranged in the vehicle and others are performed by a remote third processor, including taking steps needed for executing a single maneuver.

In some examples, the third memory 652 may contain an instruction 653 (e.g., program logic), and the instruction 653 may be executed by the third processor 651 to execute various functions of the vehicle 600. The third memory 652 may also contain additional instructions, including instructions to send data to, receive data from, interact with and/or control one or more of the infotainment system 610, the perception system 620, the decision-making control system 630 and the driving system 640.

In addition to the instruction 653, the third memory 652 may also store data, such as road maps, route information, vehicle positions, directions, speeds and other such vehicle data, as well as other information. Such information may be used by the vehicle 600 and the computation platform 650 during the operation of the vehicle 600 in autonomous, semi-autonomous and/or manual modes.

The computation platform 650 may control functions of the vehicle 600 based on inputs received from various subsystems (e.g., the driving system 640, the perception system 620, and the decision-making control system 630). For example, the computation platform 650 may use inputs from the decision-making control system 630 to control the steering system 633 to avoid obstacles detected by the perception system 620. In some examples, the computation platform 650 is operable to provide control over many aspects of the vehicle 600 and their subsystems.

Alternatively, one or more of the above assemblies may be mounted in a manner of being separated from or associated with the vehicle 600. For example, the third memory 652 may be partially or completely separated from the vehicle 600. The above assemblies may be communicatively coupled together in a wired and/or wireless manner.

Alternatively, the above assemblies are merely an example. In actual application, assemblies in the above modules may be added or deleted according to actual needs, and FIG. 8 may not be understood as a limitation to the example of the disclosure.

An autonomous driving vehicle traveling on a road, such as the above vehicle 600, may identify objects in the surroundings to determine the adjustment of a current speed. The object may be other vehicles, traffic control devices, or other types of objects. In some examples, each identified object may be considered independently, and respective features of the object, such as a current speed, acceleration, a distance from the vehicle, may be used to determine the speed to be adjusted by the autonomous driving vehicle.

Alternatively, the vehicle 600 or perception and computing devices associated with the vehicle 600 (e.g., the computation system 631 and the computation platform 650) may predict the behavior of the identified object based on the features of the identified object and a state of the surrounding environment (e.g., traffic, rain, ice on the road). Alternatively, identified objects depend on the behavior of each other, so all identified objects may also be considered together to predict the behavior of a single identified object. The vehicle 600 may adjust a speed based on the predicted behavior of the identified object. In other words, the autonomous driving vehicle may determine a goal stable state of the vehicle through adjustment (for example, by accelerating, decelerating, or stopping) based on the predicted behavior of the object. In the process, other factors may also be considered to determine the speed of the vehicle 600, such as a lateral position of the vehicle 600 on a road, curvature of the road and proximity of static and dynamic objects.

In addition to providing an instruction to adjust the speed of the autonomous driving vehicle, the computing device may further provide an instruction to change a steering angle of the vehicle 600 such that the autonomous driving vehicle follows a given track and/or maintains a safe lateral and longitudinal distance from objects near the autonomous driving vehicle (for example, vehicles in adjacent lanes on the road).

The vehicle 600 may be any type of driving tool, for example, a car, a truck, a motorcycle, a bus, a boat, an airplane, a helicopter, a recreational vehicle, a train, which is not particularly limited in the examples of the disclosure.

In another example, further provided is a computer program product. The computer program product includes a computer program executable by a programmable apparatus, and the computer program has code portions for executing the above data interaction method when executed by the programmable apparatus.

A person of ordinary skill in the art will readily conceive of other implementation solutions of the disclosure after considering the description and implementing the disclosure. The disclosure is intended to cover any modification, use or adaptive change of the disclosure, which follows general principles of the disclosure and includes common general knowledge or conventional technical means in the technical field not disclosed in the disclosure. The description and the examples are merely considered illustrative, and the true scope and spirit of the disclosure are indicated by the following claims.

It is to be understood that the disclosure is not limited to the precise structures described above and shown in the accompanying drawings, and various modifications and changes can be made without departing from the scope of the disclosure. The scope of the disclosure is merely limited by the appended claims.

To overcome the problems existing in related technologies, the disclosure provides a data interaction method and apparatus, a vehicle, a readable storage medium and a chip.

According to a first aspect of examples of the disclosure, a data interaction method is provided and is performed by a mobile terminal. The method includes forming a plurality of BLE channels by connecting a plurality of Bluetooth low energy (BLE) nodes of a vehicle separately; obtaining a service-oriented architecture (SOA) service request data packet of the vehicle, where data in the SOA service request data packet are configured to call an SOA service of the vehicle; obtaining a plurality of data sub-packets by dividing the SOA service request data packet; and sending the plurality of data sub-packets separately to the vehicle through the plurality of BLE channels.

Alternatively, the obtaining an SOA service request data packet of the vehicle may include: generating an initial SOA service request data packet according to a selection operation of a user, and obtaining the SOA service request data packet by serializing parameters of the initial SOA service request data packet.

Alternatively, the sending the plurality of data sub-packets separately to the vehicle through the plurality of BLE channels may include: traversing each of the plurality of BLE channels, and in response to detecting an idle BLE channel, performing a process of sending the data packet once until all the data sub-packets are sent to the vehicle; where the process of sending the data packet includes: selecting a target data sub-packet from the plurality of data sub-packets; obtaining a field-filled target data sub-packet by filling a header of the target data sub-packet with a service identifier, a data packet sending sequence identifier and cyclic redundancy check data, where the service identifier represents a category of the SOA service, the data packet sending sequence identifier is a data packet sending sequence corresponding to the data sub-packet, and the cyclic redundancy check data are configured to check data integrity of the data sub-packet; and transmitting the field-filled target data sub-packet by using the idle BLE channel.

According to a second aspect of the examples of the disclosure, a data interaction method is provided and is performed by a vehicle having a plurality of BLE nodes, and the method includes: receiving a BLE connection request sent by a mobile terminal; forming a plurality of BLE channels with the mobile terminal according to the BLE connection request; receiving a plurality of data sub-packets sent by the mobile terminal through the plurality of BLE channels; and obtaining an SOA service request data packet by splicing the plurality of data sub-packets, where data in the SOA service request data packet are configured to call an SOA service of the vehicle.

Alternatively, the obtaining an SOA service request data packet by splicing the plurality of data sub-packets may include: checking data legality and data integrity of a header field of each data sub-packet of the plurality of data sub-packets; and obtaining an effective field of the data sub-packet by removing, in response to determining that the data sub-packet passes the checking, the header field of the data sub-packet; determining a byte area of the effective field of the data sub-packet in a buffer area according to a data packet sending sequence identifier of the data sub-packet, where the data packet sending sequence identifier is a data packet sending sequence corresponding to the data sub-packet; and obtaining the SOA service request data packet by splicing the effective field of each data sub-packet in response to determining that the buffer area contains the effective field of each data sub-packet of the plurality of data sub-packets.

Alternatively, the checking data legality and data integrity of a header field of each data sub-packet of the plurality of data sub-packets may include: checking the consistency and legality of a service name of the data sub-packet according to a service identifier in the data sub-packet, where the service identifier represents a category of the SOA service; and checking data integrity of the data sub-packet according to cyclic redundancy check data in the data sub-packet, where the cyclic redundancy check data are configured to check the data integrity of the data sub-packet.

Alternatively, the obtaining the SOA service request data packet by splicing the effective field of each data sub-packet may include: splicing the effective field of each data sub-packet; and obtaining the SOA service request data packet by deserializing parameters of the effective field spliced.

According to a third aspect of the examples of the disclosure, a data interaction apparatus is provided and is applied to a mobile terminal. The apparatus includes: a connection module configured to form a plurality of BLE channels by connecting a plurality of BLE nodes of a vehicle separately; an obtaining module configured to obtain an SOA service request data packet of the vehicle, where data in the SOA service request data packet are configured to call the SOA service of the vehicle; a first processing module configured to obtain a plurality of data sub-packets by dividing the SOA service request data packet; and a sending module configured to send the plurality of data sub-packets separately to the vehicle through the plurality of BLE channels.

According to a fourth aspect of the examples of the disclosure, a data interaction apparatus is provided and is applied to a vehicle having a plurality of BLE nodes, and the apparatus includes: a receiving module configured to receive a BLE connection request sent by a mobile terminal; and a second processing module configured to form a plurality of BLE channels with the mobile terminal according to the BLE connection request; where the receiving module is further configured to receive a plurality of data sub-packets sent by the mobile terminal through the plurality of BLE channels; and the second processing module is further configured to obtain an SOA service request data packet by splicing the plurality of data sub-packets, where data in the SOA service request data packet are configured to call an SOA service of the vehicle.

According to a fifth aspect of the examples of the disclosure, a mobile terminal is provided. The mobile terminal includes: a processor, and a memory configured to store a processor executable instruction, where the processor is configured to implement steps of the data interaction method described by the foregoing first aspect by executing the executable instruction.

According to a sixth aspect of the examples of the disclosure, a vehicle is provided. The vehicle includes: a processor, and a memory configured to store a processor executable instruction, where the processor is configured to implement steps of the data interaction method described by the foregoing second aspect by executing the executable instruction.

According to a seventh aspect of the examples of the disclosure, a non-transitory computer-readable storage medium is provided and stores a computer program instruction, where the computer program instruction implements steps of the data interaction method provided in the first aspect or the second aspect of the disclosure when executed by a processor.

According to an eighth aspect of the examples of the disclosure, a chip is provided and includes a processor and an interface; where the processor is configured to execute steps of the data interaction method provided in the first aspect or the second aspect of the disclosure by reading an instruction.

Technical solutions provided by the examples of the disclosure may have the following beneficial effects: the mobile terminal is connected with the plurality of BLE nodes of the vehicle separately to form the plurality of BLE channels, the SOA service request data packet is obtained, the data in the SOA service request data packet are configured to call the SOA service of the vehicle, the plurality of data sub-packets are obtained by dividing the SOA service request data packet, and the plurality of data sub-packets are sent separately to the vehicle through the plurality of BLE channels; and a data packet of the mobile terminal is sent to the vehicle through the plurality of BLE nodes, and the SOA service of the vehicle is called according to the data in the data packet, such that the user may call the SOA service of the vehicle without starting the vehicle or connecting the WiFi in the vehicle, thus improving driving experience of the user.

What is claimed is:

1. A data interaction method comprising:
   forming a plurality of Bluetooth low energy (BLE) channels by connecting a plurality of BLE nodes of a vehicle separately;
   obtaining a service-oriented architecture (SOA) service request data packet of the vehicle, wherein data in the SOA service request data packet are configured to call an SOA service of the vehicle;
   obtaining a plurality of data sub-packets by dividing the SOA service request data packet; and
   sending the plurality of data sub-packets separately to the vehicle through the plurality of BLE channels.

2. The data interaction method according to claim 1, wherein obtaining an SOA service request data packet of the vehicle comprises:
   generating an initial SOA service request data packet according to a selection operation of a user; and
   obtaining the SOA service request data packet by serializing parameters of the initial SOA service request data packet.

3. A non-transitory computer-readable storage medium storing a computer program instruction, wherein the computer program instruction when executed by one or more processors cause the one or more processors to collectively execute the data interaction method of claim 2.

4. The data interaction method according to claim 1, wherein sending the plurality of data sub-packets separately to the vehicle through the plurality of BLE channels comprises:
   traversing each of the plurality of BLE channels, and in response to detecting an idle BLE channel, executing a packet sending process once until all the data sub-packets are sent to the vehicle;
   wherein the packet sending comprises:
   selecting a target data sub-packet from the plurality of data sub-packets;
   obtaining a field-filled target data sub-packet by filling a header of the target data sub-packet with a service identifier, a packet sending sequence identifier and cyclic redundancy check data, wherein the service identifier represents a category of the SOA service, the packet sending sequence identifier is a packet sending sequence corresponding to the target data sub-packet, and the cyclic redundancy check data are configured to check data integrity of the target data sub-packet; and
   transmitting the field-filled target data sub-packet by using the idle BLE channel.

5. A mobile terminal, comprising:
   a memory configured to store a processor executable instruction; and
   one or more processors that are communicatively coupled to the memory;
   wherein the one or more processors are collectively configured to implement the method according to claim 1.

6. The mobile terminal according to claim 5, wherein the one or more processors are further collectively configured to:
   generate an initial SOA service request data packet according to a selection operation of a user; and
   obtain the SOA service request data packet by serializing parameters of the initial SOA service request data packet.

7. The mobile terminal according to claim 5, wherein the one or more processors are further collectively configured to:
   traverse each of the plurality of BLE channels, and in response to detecting an idle BLE channel, execute a packet sending process once until all the data sub-packets are sent to the vehicle;
   wherein the packet sending process comprises:
   selecting a target data sub-packet from the plurality of data sub-packets;
   obtaining a field-filled target data sub-packet by filling a header of the target data sub-packet with a service identifier, a packet sending sequence identifier and cyclic redundancy check data, wherein the service identifier represents a category of the SOA service, the packet sending sequence identifier is a packet sending sequence corresponding to the target data sub-packet, and the cyclic redundancy check data are configured to check data integrity of the target data sub-packet; and
   transmitting the field-filled target data sub-packet by using the idle BLE channel.

8. A non-transitory computer-readable storage medium storing a computer program instruction, wherein the computer program instruction when executed by one or more processors cause the one or more processors to collectively execute the data interaction method of claim 1.

9. A chip comprising:
   a processor; and
   an interface communicatively coupled to the processor, wherein the processor is configured to execute the data interaction method of claim 1.

10. A data interaction method comprising:
    receiving a Bluetooth low energy (BLE) connection request sent by a mobile terminal;
    forming a plurality of BLE channels with the mobile terminal according to the BLE connection request;
    receiving a plurality of data sub-packets sent by the mobile terminal through the plurality of BLE channels; and
    obtaining a service-oriented architecture (SOA) service request data packet by splicing the plurality of data sub-packets, wherein data in the SOA service request data packet are configured to call an SOA service of a vehicle.

11. The data interaction method according to claim 10, wherein obtaining the SOA service request data packet by splicing the plurality of data sub-packets comprises:
    checking for data legality and data integrity of a header field of each data sub-packet of the plurality of data sub-packets; and
    obtaining an effective field of the data sub-packet by removing, in response to determining that the data sub-packet passes the checking, the header field of the data sub-packet;
    determining a byte area of the effective field of the data sub-packet in a buffer area according to a packet sending sequence identifier of the data sub-packet, wherein the packet sending sequence identifier is a packet sending sequence corresponding to the data sub-packet; and
    obtaining the SOA service request data packet by splicing the effective field of each data sub-packet in response to determining that the buffer area contains the effective field of each data sub-packet of the plurality of data sub-packets.

12. The data interaction method according to claim 11, wherein checking for the data legality and data integrity of the header field of each data sub-packet of the plurality of data sub-packets comprises:

checking for consistency and legality of a service name of the data sub-packet according to a service identifier in the data sub-packet, wherein the service identifier represents a category of the SOA service; and checking data integrity of the data sub-packet according to cyclic redundancy check data in the data sub-packet, wherein the cyclic redundancy check data are configured to check the data integrity of the data sub-packet.

13. The data interaction method according to claim 11, wherein obtaining the SOA service request data packet by splicing the effective field of each data sub-packet comprises:

splicing the effective field of each data sub-packet; and obtaining the SOA service request data packet by deserializing parameters of the effective field spliced.

14. A non-transitory computer-readable storage medium storing a computer program instruction, wherein the computer program instruction when executed by one or more processors cause the one or more processors to collectively execute the data interaction method of claim 11.

15. A non-transitory computer-readable storage medium storing a computer program instruction, wherein the computer program instruction when executed by one or more processors cause the one or more processors to collectively execute the data interaction method of claim 10.

16. A chip comprising:

a processor; and an interface communicatively coupled to the processor, wherein the processor is configured to execute the data interaction method of claim 10.

17. A vehicle, having a plurality of BLE nodes, comprising:

a memory configured to store a processor executable instruction; and one or more processors that are communicatively coupled to the memory, wherein the one or more processors are collectively configured to:

receive a Bluetooth low energy (BLE) connection request sent by a mobile terminal, form a plurality of BLE channels with the mobile terminal according to the BLE connection request, receive a plurality of data sub-packets sent by the mobile terminal through the plurality of BLE channels, and obtain a service-oriented architecture (SOA) service request data packet by splicing the plurality of data sub-packets, wherein data in the SOA service request data packet are configured to call an SOA service of the vehicle.

18. The vehicle according to claim 17, wherein the one or more processors are further collectively configured to:

check for data legality and data integrity of a header field of each data sub-packet of the plurality of data sub-packets, obtain an effective field of the data sub-packet by removing, in response to determining that the data sub-packet passes the check, the header field of the data sub-packet, determine a byte area of the effective field of the data sub-packet in a buffer area according to a packet sending sequence identifier of the data sub-packet, wherein the packet sending sequence identifier is a packet sending sequence corresponding to the data sub-packet, and obtain the SOA service request data packet by splicing the effective field of each data sub-packet in response to determining that the buffer area contains the effective field of each data sub-packet of the plurality of data sub-packets.

19. The vehicle according to claim 17, wherein the one or more processors are further collectively configured to:

check for consistency and legality of a service name of a target data sub-packet according to a service identifier in the target data sub-packet, wherein the service identifier represents a category of the SOA service; and check for data integrity of the target data sub-packet according to cyclic redundancy check data in the target data sub-packet, wherein the cyclic redundancy check data are configured to check for the data integrity of the target data sub-packet.

20. The vehicle according to claim 17, wherein the one or more processors are further collectively configured to:

splice an effective field of each data sub-packet; and obtain the SOA service request data packet by deserializing parameters of the effective field spliced.

\* \* \* \* \*

UNITED STATES PATENT AND TRADEMARK OFFICE
CERTIFICATE OF CORRECTION

| | | |
|---|---|---|
| PATENT NO. | : 12,113,883 B2 | Page 1 of 1 |
| APPLICATION NO. | : 18/104041 | |
| DATED | : October 8, 2024 | |
| INVENTOR(S) | : Gang Wang | |

It is certified that error appears in the above-identified patent and that said Letters Patent is hereby corrected as shown below:

In the Specification

In Column 1, Line 9, delete "Nov. 4, 2022," and insert -- Sep. 30, 2022, --, therefor.

In Column 11, Line 38, delete "ultra-wide band" and insert -- ultra-wideband --, therefor.

In Column 11, Line 53, delete "read only" and insert -- read-only --, therefor.

In the Claims

In Column 20, Line 52, in Claim 11, delete "sub-packets; and" and insert -- sub-packets; --, therefor.

Signed and Sealed this
Seventeenth Day of December, 2024

Derrick Brent
*Acting Director of the United States Patent and Trademark Office*